United States Patent
Hamatani et al.

(10) Patent No.: US 9,050,681 B2
(45) Date of Patent: Jun. 9, 2015

(54) METHOD OF PRODUCTION OF ELECTRIC RESISTANCE WELDED STEEL PIPE AND HIGH SI OR HIGH CR ELECTRIC RESISTANCE WELDED STEEL PIPE

(75) Inventors: Hideki Hamatani, Tokyo (JP); Shinji Kodama, Tokyo (JP); Nobuo Mizuhashi, Futtsu (JP); Sunao Takeuchi, Tokyo (JP); Tomohiro Nakaji, Tokyo (JP); Takashi Miyakawa, Tokyo (JP); Hitoshi Asahi, Tokyo (JP); Michitoshi Tanimoto, Tokyo (JP); Michimasa Mukai, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 983 days.

(21) Appl. No.: 12/449,812

(22) PCT Filed: Feb. 29, 2008

(86) PCT No.: PCT/JP2008/054100
§ 371 (c)(1),
(2), (4) Date: Aug. 26, 2009

(87) PCT Pub. No.: WO2008/108450
PCT Pub. Date: Sep. 12, 2008

(65) Prior Publication Data
US 2010/0104888 A1    Apr. 29, 2010

(30) Foreign Application Priority Data

Mar. 2, 2007 (JP) .................... 2007-052423

(51) Int. Cl.
*B23K 10/00* (2006.01)
*B23K 13/00* (2006.01)
*B23K 13/06* (2006.01)

(52) U.S. Cl.
CPC ......... *B23K 13/00* (2013.01); *Y10T 428/12292* (2013.01); *B23K 10/00* (2013.01); *B23K 13/06* (2013.01); *B23K 2201/06* (2013.01); *B23K 2203/04* (2013.01)

(58) Field of Classification Search
CPC .................................................. B21C 37/08
USPC ...... 219/55, 59.1, 60 R, 60.2, 61, 67, 121.13, 219/121.36, 121.39, 121.41, 121.44, 219/121.46, 121.47, 121.48, 121.64, 219/121.51, 121.55, 121.84
See application file for complete search history.

(56) References Cited

U.S. PATENT DOCUMENTS

| | | | | |
|---|---|---|---|---|
| 4,861,962 | A | * | 8/1989 | Sanders et al. ............. 219/121.5 |
| 5,192,016 | A | * | 3/1993 | Araki et al. .................... 228/147 |

(Continued)

FOREIGN PATENT DOCUMENTS

| | | |
|---|---|---|
| JP | 10-80718 | 3/1998 |
| JP | 2004-243374 | 9/2004 |

(Continued)

OTHER PUBLICATIONS

Machine Translation, Ishiizuka et al., JP 2005-230909, Sep. 2005.*

(Continued)

*Primary Examiner* — Brian Jennison
(74) *Attorney, Agent, or Firm* — Kenyon & Kenyon LLP (57) ABSTRACT

The present invention provides a method of production of electric resistance welded steel pipe able to stably reduce weld defects due to oxides by firing plasma and furthermore able to reduce plasma jet noise and comprises shaping steel plate 1 into a tube and electric resistance welding the abutting end faces 4 during which blowing on at least the abutting end faces 4a in the region 6 at the welding upstream side from the weld point 9 where the temperature becomes 650° C. or more a reducing high temperature (pseudo) laminar plasma obtained by applying voltage to a reducing gas containing $H_2$ gas: 2 to 50 vol % to which is added a balance of Ar gas alone or a mixed gas of Ar gas to which $N_2$ gas, He gas, or both are added. At that time, it is preferable to make the applied voltage over 120V and the make the plasma blowing conditions satisfy the following formula (1).

$$150 < \frac{4 \times \left(\sum G_i M_i\right)}{\pi \times D \times \mu_{ava, T=7000}} < 400 \qquad <1>$$

8 Claims, 4 Drawing Sheets

(56) References Cited

U.S. PATENT DOCUMENTS

| | | | |
|---|---|---|---|
| 5,451,470 A * | 9/1995 | Ashary et al. | 428/552 |
| 5,981,081 A * | 11/1999 | Sue | 428/564 |
| 6,334,977 B1 * | 1/2002 | Matsui et al. | 420/70 |
| 2007/0246446 A1 * | 10/2007 | Lee et al. | 219/121.64 |

FOREIGN PATENT DOCUMENTS

| | | |
|---|---|---|
| JP | 2004-298961 | 10/2004 |
| JP | 2005-230909 | 9/2005 |
| JP | 2006-26691 | 2/2006 |

OTHER PUBLICATIONS

Russian Office Action dated Nov. 9, 2010 issued in corresponding Russian Application No. 2009136411/02.

Aleshin et al., "Welding, Cutting, Control", vol. 1, Moscow, Mashinostroenie, 2004, P.406.

International Search Report dated May 13, 2008 issued in corresponding PCT Application No. PCT/JP2008/054100.

* cited by examiner

METHOD OF PRODUCTION OF ELECTRIC RESISTANCE WELDED STEEL PIPE AND HIGH SI OR HIGH CR ELECTRIC RESISTANCE WELDED STEEL PIPE

This application is a national stage application of International Application No. PCT/JP2008/054100, filed 29 Feb. 2008, which claims priority to Japanese Application No. 2007-052423, filed 2 Mar. 2007, which is incorporated by reference in its entirety.

TECHNICAL FIELD

The present invention relates to a method of production of electric resistance welded steel pipe used mainly for oil or natural gas line pipes, oil well pipes, and steel pipes for nuclear power use, geothermal use, chemical plant use, mechanical structure use, and general piping use, more particularly relates to a method of production of electric resistance welded steel pipe suitable when using steel plate containing large amounts of Cr, Si, and other elements easily forming oxides as the steel pipe material and to a high Si or high Cr electric resistance welded steel pipe.

BACKGROUND ART

Figure 4:
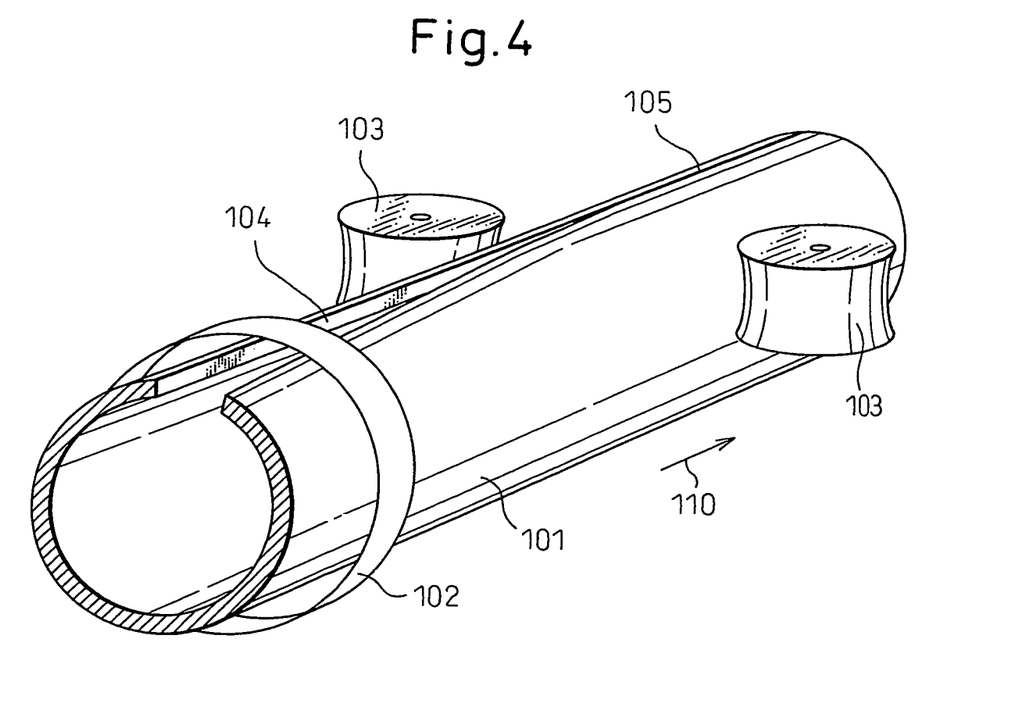
FIG. 4 is a perspective view schematically showing a conventional method of production of electric resistance welded steel pipe.

FIG. 4 is a schematic view showing a conventional method of production of electric resistance welded steel pipe. As shown in FIG. 4, in the conventional method of production of electric resistance welded steel pipe, generally strip shaped steel plate 101 is continuously conveyed toward a direction 110 while being shaped into a tube by a large number of rolls (not shown), the abutting end faces 104 are melted by induction heating by a high frequency coil 102 or by direct conduction heating by a contact tip, and squeeze rolls 103 are used to apply upset so as to form a weld seam 105 at the abutting end faces 104 and thereby obtain electric resistance welded steel pipe.

In such a conventional process of production of electric resistance welded steel pipe, the abutting end faces 104 are exposed to the atmosphere at the time of electric resistance welding, so oxides are formed at the surfaces. These sometimes remain without being squeezed out, whereby weld defects caused by the oxides, called "penetrators", are formed at the weld zone. In particular, when using Cr steel with a Cr content of 2 to 11 mass %, stainless steel with a Cr content of 12 mass % or more, ferrite-martensite composite structure steel (DP steel; volume percentage of second phase martensite of 5% or more) and ferrite-austenite composite structure steel (TRIP type composite structure steel; low alloy high strength steel utilizing transformation induced plasticity of volume percent 5% or more residual austenite), or other such steel plate containing large amounts of Cr, Si, or other elements easily forming oxides, penetrators easily are formed in the weld zone. Such weld defects become causes lowering the low temperature toughness, corrosion resistance, and cold workability of steel pipe, so in the past, in the process of production of electric resistance welded steel pipe, an inert gas shield was used at the time of electric resistance welding so as to reduce the amount of oxygen in the atmosphere of the weld zone so as to try to reduce the formation of penetrators. However, with an inert gas shield, since air entrainment etc. occur, it is difficult to stably make the atmosphere of the electric resistance weld zone a low oxygen state. On the other hand, to stably maintain the low oxygen state of the electric resistance weld zone, a bulky shield apparatus would be necessary and the productivity would greatly drop.

Further, the inventors proposed a method of production of electric resistance welded steel pipe comprising blowing a 1400° C. or higher reducing high temperature combustion flame or nonoxidizing high temperature plasma on to the abutting end faces by a predetermined flow rate at the time of electric resistance welding steel pipe so as to suppress the formation of oxides at the abutting end faces and promote the expulsion of oxides (see Japanese Patent Publication (A) No. 2004-298961). The art described in this Japanese Patent Publication (A) No. 2004-298961 enables reduction of the penetrators in the electric resistance weld zone compared with the conventional method without lowering the productivity. However, this method has the problem that if trying to further reduce the penetrators at the weld zone by increasing the flow rate of the high temperature combustion flame or plasma to raise the shear force of the thermal fluid, the entrainment of air around the weld zone becomes remarkable and conversely the penetrators end up increasing. Therefore, with the art described in Japanese Patent Publication (A) No. 2004-298961, it is not possible to sufficiently reduce the formation of penetrators.

Therefore, the inventors engaged in further studies and proposed a method of production of electric resistance welded steel pipe comprising blowing inert gas at a predetermined butt angle on to the abutted end faces across the entire range from at least the weld point to the welding upstream side where the temperature becomes 650° C. or more and blowing a nonoxidizing high temperature plasma in a nonoxidizing atmosphere at a temperature of 1400° C. or more by a flow rate of 30 to 270 m/sec on to the abutted end faces across the entire range from at least the weld point to a position at the welding upstream side exactly ⅕ the power feed distance (power feed distance: distance from high frequency coil or power feed tip to weld point) (see Japanese Patent Publication (A) No. 2006-026691). With the method of production of electric resistance welded steel pipe described in this Japanese Patent Publication (A) No. 2006-026691, it is possible to reduce the weld defects caused by the formation of oxides at the weld zone and cold weld defects caused by insufficient local input heat without lowering the productivity and further without changing the set conditions at the time of fluctuation of the welding conditions.

Further, an invention relating to a plasma torch defining the side gas ejection direction so as to raise the processing efficiency and precision of high temperature working such as plasma jet welding, cutting, flame spraying, and heating is disclosed in Japanese Patent Publication (A) No. 2004-243374.

DISCLOSURE OF THE INVENTION

However, the method of production of electric resistance welded steel pipe described in the above-mentioned Japanese Patent Publication (A) No. 2006-026691 uses a turbulent plasma jet (plasma fired from plasma gun), so there was the problem that even if arranging a shield gas around it for blocking the air, the air would end up being entrained. For example, even if using the firing angle and flow rate of shield gas proposed in Japanese Patent Publication (A) No. 2004-243374, the concentration of oxygen in the plasma jet sometimes could not be sufficiently reduced. For this reason, with the method of production of electric resistance welded steel pipe described in Japanese Patent Publication (A) No. 2006-026691, sometimes the amount of oxides of the weld zone cannot be stably reduced and the number of defects ends up exceeding the target value. Furthermore, the method of production of electric resistance welded steel pipe described in Japanese Patent Publication (A) No. 2006-026691 uses a turbulent, high speed plasma jet, so there is also the problem of a large plasma jet noise being caused when welding abutting parts.

Therefore, the present invention was made in consideration of the above problem points and has as its object the provision of a method of production of electric resistance welded steel enabling the occurrence of weld defects due to oxides to be stably reduced and furthermore enabling the plasma jet noise occurring at the time of welding to be reduced and the provision of high Si or high Cr electric resistance welded steel pipe.

To solve the above problems, the gist of the present invention lies in the following:

(1) A method of production of electric resistance welded steel pipe comprising shaping steel plate into a tube and electric resistance welding abutting end faces, said method of production of electric resistance welded steel pipe characterized by using a cascade type plasma gun, which applies voltage in a cathode gas between a cathode and an anode to produce plasma gas and blows an anode gas to eject plasma as a plasma working gas, to blow a reducing high temperature laminar plasma or reducing high temperature quasi-laminar plasma, given a reducing ability by adjusting the ingredients of said plasma working gas to contain $H_2$ gas: 2 vol % to less than 50 vol % and have a balance of Ar gas and unavoidable impurity gases or a balance of a mixed gas of Ar gas plus $N_2$ gas, He gas, or both and unavoidable impurities, on at least abutting end faces in a region at a welding upstream side of a weld point of said electric resistance welding where the temperature becomes 650° C. or more.

(2) A method of production of electric resistance welded steel pipe as set forth in (1), characterized by making a distance L from a front end of a cathode of said plasma gun to an anode formable position 8 mm or more and not more than 10 times the anode inside diameter D, making the voltage applied between the cathode and anode of the plasma gun a voltage over 120V, and employing plasma blowing conditions satisfying the following formula <1> where the flow rate in the standard state of said plasma working gas is $G_i$ (l/min), the relative molecular weight of said plasma working gas is $M_i$, the anode inside diameter is D (m), and the viscosity coefficient at 7000K is $\mu_{ave,T=7000}$ (kg/m/sec), so as to make said plasma laminar or quasi-laminar:

$$150 < \frac{4 \times \left(\sum G_i M_i\right)}{\pi \times D \times \mu_{ave,T=7000}} < 400 \qquad <1>$$

(3) A method of production of electric resistance welded steel pipe as set forth in (1) or (2), characterized in that said plasma gun has an anode inside diameter D of 16 mm to 30 mm.

(4) A method of production of electric resistance welded steel pipe as set forth in any one of (1) to (3), characterized by providing a front or a front outer circumference of the anode of said plasma gun with ejection ports at positions of distances from a center axis of 1.5 to 3.5 times the inside radius of said anode and with orientations facing axially symmetric directions in a range of 10 to 30° from the plasma center axial direction to the outside and ejecting from the ejection ports a side shield gas comprised of one or more inert gases selected from the group comprising Ar gas, $N_2$ gas, and He gas and unavoidable impurity gases by a gas flow rate of 1 to 3 times the gas flow rate of said plasma.

(5) A method of production of electric resistance welded steel pipe as set forth in any one of (1) to (4), characterized by using one or both of $CH_4$ gas and $C_2H_2$ gas replacing part or all of the $H_2$ gas forming said plasma working gas.

(6) A method of production of electric resistance welded steel pipe as set forth in any one of (1) to (5), characterized by feeding a fine powder of boride of an average particle size of 1 μm to 10 μm into said reducing high temperature laminar plasma or reducing high temperature quasi-laminar plasma.

(7) A method of production of electric resistance welded steel pipe as set forth in any one of (1) to (6), characterized by making a front end of said cathode a semispherical shape and making a radius of curvature of this semispherical shape front end ½ or less of the anode inside diameter.

(8) A method of production of electric resistance welded steel pipe as set forth in any one of (1) to (7), characterized by using an impeder in said method of production of electric resistance welded steel pipe and using for the material of an impeder case used for this impeder a ceramic having an electrical resistance at 300° C. based on JIS C2141 of $10^{11}$ to $10^{13}$ Ωcm and a thermal shock characteristic found by a water quenching method of 500° C. or more.

(9) A method of production of electric resistance welded steel pipe as set forth in any one of (1) to (8), characterized by making a distance between a front end of said plasma gun and the steel pipe surface 150 mm to 300 mm.

(10) An electric resistance welded steel pipe produced by a method of production of electric resistance welded steel pipe as set forth in any one of claims (1) to (9), characterized in that said steel plate is comprised of Si containing steel plate containing, by mass %, Si: 0.5 to 2.0% or Cr containing steel plate containing Cr: 0.5 to 26% and in that a defect rate of an electric resistance weld zone is 0.01% or less.

BEST MODE FOR CARRYING OUT THE INVENTION

Below, a best mode for carrying out the present invention will be explained in detail with reference to the attached drawings.

Figure 1A:
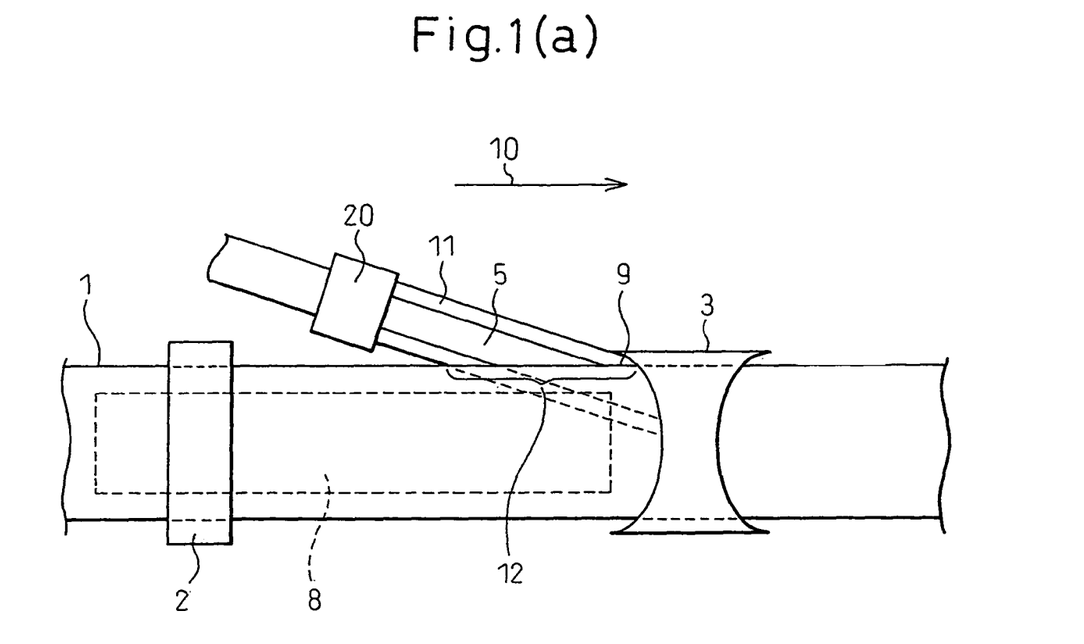
FIG. 1(a) is a side view schematically showing a method of production of electric resistance welded steel pipe of the present invention.
Figure 1B:
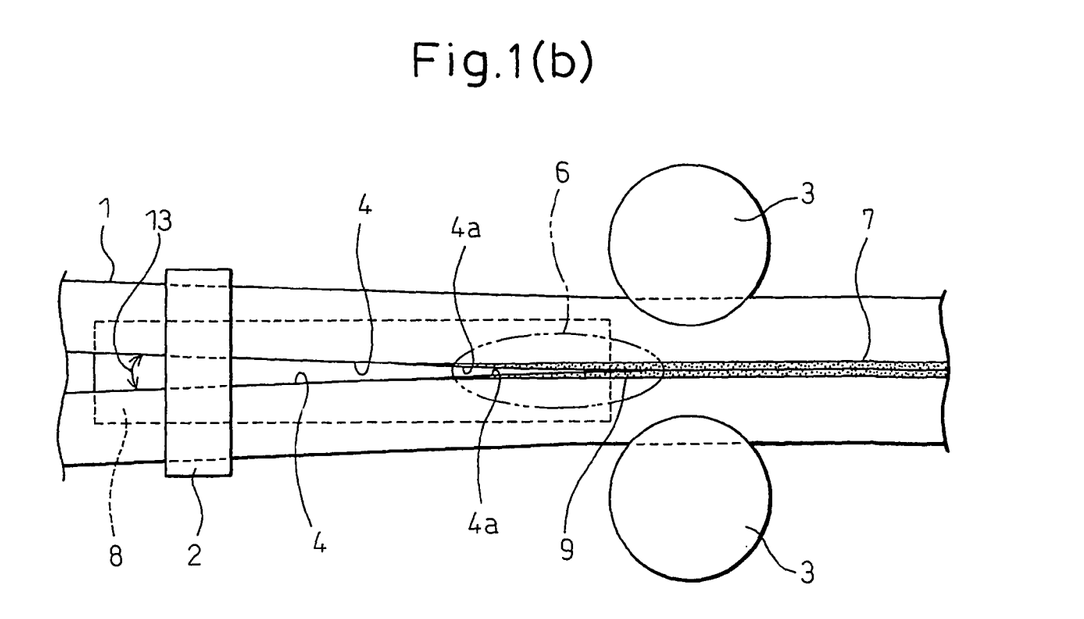
FIG. 1(b) is a plan view schematically showing a method of production of electric resistance welded steel pipe of the present invention.

First, regarding the method of production of electric resistance welded steel pipe of the present invention described in (1), the case of using a high frequency coil to heat the steel plate will be explained as an example. FIG. 1(a) is a side view showing the method of production of electric resistance welded steel pipe of the present embodiment, while FIG. 1(b) is a plan view of the same. As shown in FIG. 1(a) and FIG. 1(b), in the method of production of electric resistance welded steel pipe of the present embodiment, steel plate 1 of for example a thickness of 1 to 22 mm or so is continuously conveyed toward a direction 10 while shaping it into a tube by a large number of rolls (not shown), the abutting end faces 4 are melted by induction heating by a high frequency coil 2, and squeeze rolls 3 are used to give upset so as to form a weld seam 7 at the abutting end faces 4.

At that time, the method uses a cascade type plasma gun 20, which applies voltage in a cathode gas between a cathode and an anode to produce plasma gas and blows an anode gas to eject plasma as a plasma working gas, to blow a reducing high temperature laminar plasma or reducing high temperature quasi-laminar plasma 5, given a reducing ability by adjusting the ingredients of said plasma working gas to contain $H_2$ gas: 2 vol % to less than 50 vol % and have a balance of Ar gas and unavoidable impurity gases or a balance of a mixed gas of Ar gas plus $N_2$ gas, He gas, or both and unavoidable impurities, on at least abutting end faces 4a in a region 6 at a welding upstream side of a weld point 9 of said electric resistance welding where the temperature becomes 650° C., or more.

The region 6 at the abutting end faces 4 at the welding upstream side from the weld point 9 where the heating temperature becomes 650° C. or more is sprayed with cooling water of the high frequency coil 2, squeeze rolls 3, impeder 8, etc. or exposed to a steam atmosphere, so the formation of weld defects formed due to oxides formed by an oxidation reaction along with the heating temperature conditions, that is, penetrators, becomes remarkable. Therefore, in the method of production of electric resistance welded steel pipe of the present embodiment, a reducing high temperature laminar plasma or reducing high temperature quasi-laminar plasma 5 is blown on this region 6 to make the abutting end faces 4a at the time of electric resistance welding a reducing atmosphere, promote the action of expelling the oxides from the abutting end faces in a high temperature molten state, and suppress the formation of penetrators due to oxides and other weld defects.

Figure 2:
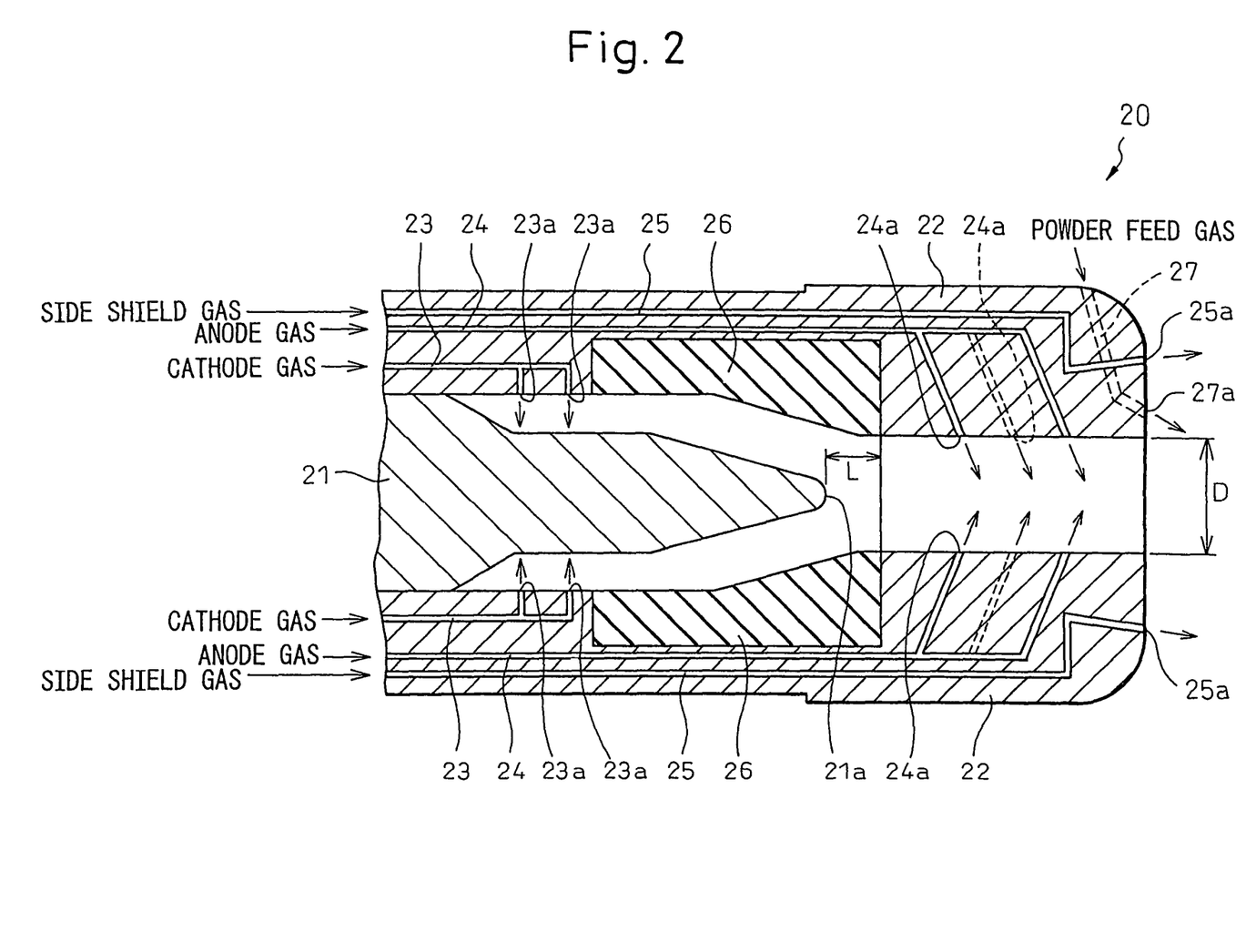
FIG. 2 is a cross-sectional view schematically showing the configuration of a plasma gun shown in FIG. 1(a) and FIG. 1(b).

An example of the cascade type plasma gun of the present invention is shown in FIG. 2. As the plasma gun 20, a cascade type plasma torch provided with an insulator 26 so as to surround the front end of the cathode 21 at the inside (cathode 21 side) part of the anode 22 and, furthermore, provided with cathode gas channels 23, anode gas channels 24, and side shield gas channels 25 inside the anode 22 is used. Further, at the inside surface of the anode 22 of this plasma gun 20, cathode feed ports 23a connected to the cathode gas channels 23 are formed at the plasma upstream side across the insulator 26 while anode gas ejection ports 24a connected to the anode gas channels 24 are formed at the downstream side. Furthermore, the front end of the anode 22 is formed with side shield gas feed ports 25a connected to the side shield gas channels 25.

Furthermore, in accordance with need, the front end of the anode 22 is formed with a powder feed gas feed hole 27a connected to a powder feed gas channel 27.

That is, in the method of production of electric resistance welded steel pipe of the present embodiment, voltage is applied between the cathode 21 and anode 22 in a cathode gas fed from the cathode gas feed ports 23a toward the cathode 21 so as to generate plasma gas and anode gas is ejected at the plasma downstream side from the cathode front end 21a toward the plasma 5 to eject high temperature (pseudo) laminar plasma 5 as a plasma working gas comprised of a cathode gas and anode gas. The anode gas can be ejected toward the plasma 5 at the plasma downstream side from the cathode front end 21a so as to make the anode point move to the plasma downstream side of the inside wall of the anode.

As a result, the distance between the cathode front end 21a and the anode point becomes longer, so the voltage becomes higher and a (pseudo) laminar plasma jet is more easily formed. Making the plasma working gas comprised of the cathode gas and anode gas include hydrogen contributes to reducing the high temperature (pseudo) laminar plasma 5. In accordance with need, if ejecting side shield gas 11 from the front end of the anode 22 so as to surround the plasma 5, it is possible to advantageously prevent entry of oxygen into this high temperature (pseudo) laminar plasma 5, so this is preferred. Furthermore, in accordance with need, it is possible and preferable to feed fine powder of boride from the front end of the anode 22 to the high temperature (pseudo) laminar plasma 5 so as to obtain a reducing ability higher than hydrogen.

In the method of production of electric resistance welded steel pipe of the present embodiment, the plasma jet is made laminar or quasi-laminar, so compared with the art described in the above-mentioned Japanese Patent Publication (A) No. 2006-026691, it is possible to greatly reduce the entrainment of air. As a result, it is possible to reduce the amount of oxides of the weld zone to reduce the rate of the weld defects due to the oxides (weld defect rate) to 0.01% or less and possible to also reduce the plasma jet noise occurring at the time of welding.

Note that the "weld defect rate" referred to here is the area rate of the penetrators (weld defects due to oxides) with respect to the weld area. Further, "quasi-laminar" means the state where the plasma core of the plasma jet is laminar and the several mm of the outside of the plasma is turbulent. Whether the plasma jet further from the inner surface of the steel pipe (side to inside pipe from abutting end faces 4 of steel pipe) is turbulent or (pseudo) laminar is not an issue.

The $H_2$ gas included in the plasma working gas used in the method of production of electric resistance welded steel pipe of the present embodiment has the effect of raising the coefficient of heat transfer and making the atmosphere a reducing one to suppress an oxidation reaction at the abutting end faces 4a. However, if the content of $H_2$ gas in the plasma working gas is less than 2 vol %, the above-mentioned effect cannot be obtained. On the other hand, if the content of $H_2$ gas in the plasma working gas is 50 vol % or more, the plasma becomes unstable. Accordingly, the content of $H_2$ gas in the plasma working gas is made 2 vol % to less than 50 vol %.

Further, the ingredients other than the $H_2$ gas in this plasma working gas include Ar gas alone and unavoidable impurity gases or a mixed gas of Ar gas plus $N_2$ gas, He gas, or both and unavoidable impurity gases. To secure the stability of the plasma, the Ar gas is preferably made the main ingredient, but by adding suitable amounts of $N_2$ gas and/or He gas, it is possible to improve the coefficient of heat transfer of the plasma and raise the heating ability at the abutting end faces 4a of the steel plate 1. However, when the ratio of the Ar gas in the plasma working gas is 50 vol % or less, the plasma sometimes becomes unstable, so when adding $N_2$ gas and He gas to the plasma working gas, it is preferable that the ratio of the Ar gas in the plasma working gas exceed 50 vol %, that is, the ratio of the $N_2$ gas, He gas, and $H_2$ gas in the plasma working gas be a total of less than 50 vol %.

The above-mentioned reducing high temperature laminar plasma or reducing high temperature quasi-laminar plasma 5 can be produced using for example the widely industrially used direct current plasma generation apparatuses for flame spraying. The thus produced plasma has a higher gas temperature than even the flame of combustion produced by a usual gas burner etc., has a plasma length in the high temperature region of 60 mm or more, and has a plasma diameter of 5 mm or more, so is a heat source with an excellent seam following ability at the time of electric resistance welding and is able to relatively easily track changes in the seam position.

Further, to sufficiently obtain the above effects, it is preferable that the temperature of the reducing high temperature laminar plasma or reducing high temperature quasi-laminar plasma 5 be made 1400° C. or more. In particular, the melting point of the Mn—Si—O composite oxides easily produced in the process of production of electric resistance welded steel pipe is 1250 to 1410° C., while the melting point of Cr oxides is 2300° C., so to make these oxides melt, the temperature of the reducing high temperature laminar plasma or reducing high temperature quasi-laminar plasma 5 is more preferably made 2400° C. or more.

On the other hand, the higher the temperature of the reducing high temperature laminar plasma or reducing high temperature quasi-laminar plasma 5, the more the action of causing the already produced oxides to melt and be expelled from the abutting end faces in the high temperature state is promoted, so the weld defects are reduced. Therefore, the upper limit of the temperature of the reducing high temperature laminar plasma or reducing high temperature quasi-laminar plasma 5 does not particularly have to be set.

Next, in the method of production of electric resistance welded steel pipe of the present invention described in (2), it is preferable to make the distance L from the front end 21*a* of the cathode of the plasma gun 20 to the anode formable position 8 mm or more and not more than 10 times the anode inside diameter D, make the voltage applied between the cathode 21 and anode 22 of the plasma gun a voltage over 120V, and employ plasma blowing conditions satisfying the following formula <1> where the flow rate in the standard state of said plasma working gas is $G_i$ (l/min), the relative molecular weight of said plasma working gas is $M_i$, the anode inside diameter is D (m), and the viscosity coefficient at 7000K is $\mu_{ave,T=7000}$ (kg/m/sec), so as to make said plasma laminar or quasi-laminar.

Note that in the formula <1>, in the unit conversions of $G_i$, $M_i$, D, and $\mu$, $\{4\times(\Sigma G_i M_i)\}/\{\pi \times D \times \mu_{ave,T=7000}\}$ is assumed to be multiplied with $(1/22.4)\times(1/60)$:

$$150 < \frac{4\times(\sum G_i M_i)}{\pi \times D \times \mu_{ave,T=7000}} < 400 \qquad <1>$$

In the method of production of electric resistance welded steel pipe of the present embodiment, reducing high temperature laminar plasma or reducing high temperature quasi-laminar plasma 5 is blown on to at least the abutting end faces 4*a* in the region 6 at the welding upstream side from the weld point 9 where the temperature becomes 650° C. or more, but if the conditions at that time deviate from the above formula <1>, that is, when $\{4\times(\Sigma G_i M_i)\}/\{\pi \times D \times \mu_{ave,T=7000}\}$ is 400 or more, the plasma jet becomes turbulent, so the atmosphere is easily entrained and the amount of oxides at the weld zone easily increases. As a result, it no longer becomes possible to stably reduce the weld defects due to oxides and the plasma jet noise occurring at the time of welding becomes larger.

Further, with $\{4\times(\Sigma G_i M_i)\}/\{\pi \times D \times \mu_{ave,T=7000}\}$ of 150 or less, the gas flow rate is insufficient and the water near the weld point cannot be removed, so it easily becomes impossible to stably reduce weld defects due to oxides. Therefore, when blowing reducing high temperature laminar plasma or reducing high temperature quasi-laminar plasma 5, it is preferable to satisfy the above formula <1>.

However, even if satisfying the above formula <1>, when the voltage applied to the plasma working gas is 120V or less, the speed of the gas in the plasma radial direction between the cathode point and the anode point becomes faster, so the plasma jet is easily dispersed and easily becomes turbulent at the plasma torch front end. For this reason, the applied voltage applied to the plasma working gas is preferably made higher than 120V.

Further, the plasma gun 20 used in the method of production of electric resistance welded steel pipe of the present embodiment preferably has a distance L from the cathode front end 21*a* to the anode formable position of 8 mm or more and not more than 10 times the inside diameter D of the anode 22. The voltage applied to the plasma gun 20 differs according to the distance L from the cathode front end 21*a* to the anode formable position.

The voltage applied to the plasma gun 20 differs depending on the plasma working gas flow rate and composition, but when using as the plasma working gas a reducing gas containing $H_2$ gas in an amount of 2 vol % to less than 50 vol %, if the distance L from the cathode front end 21*a* to the anode formable position is less than 8 mm, it no longer becomes possible to apply over a 120V voltage to the plasma gun 20. On the other hand, when using a cascade type plasma gun etc., if the distance L from the cathode front end 21*a* to the anode formable position exceeds 10 times the inside diameter D of the anode 22, it becomes difficult to maintain the plasma 5. Therefore, the distance L is preferably 8 mm≤L≤10×D.

Next, in the method of production of electric resistance welded steel pipe of the present invention described in (3), when the power feed distance at the time of electric resistance welding (power feed distance: distance from high frequency coil 2 or power feed tip to weld point 9) exceeds 100 mm, to secure the shield range 12 {range of abutting end faces shielded by plasma. When using side shield gas, including the range shielded by the side shield gas (see FIG. 1(*a*))}, the anode inside diameter of the plasma gun 20 is preferably 16 mm or more. However, if the anode inside diameter exceeds 30 mm, the plasma becomes unstable, so the anode inside diameter has to be 30 mm or less.

Figure 3:
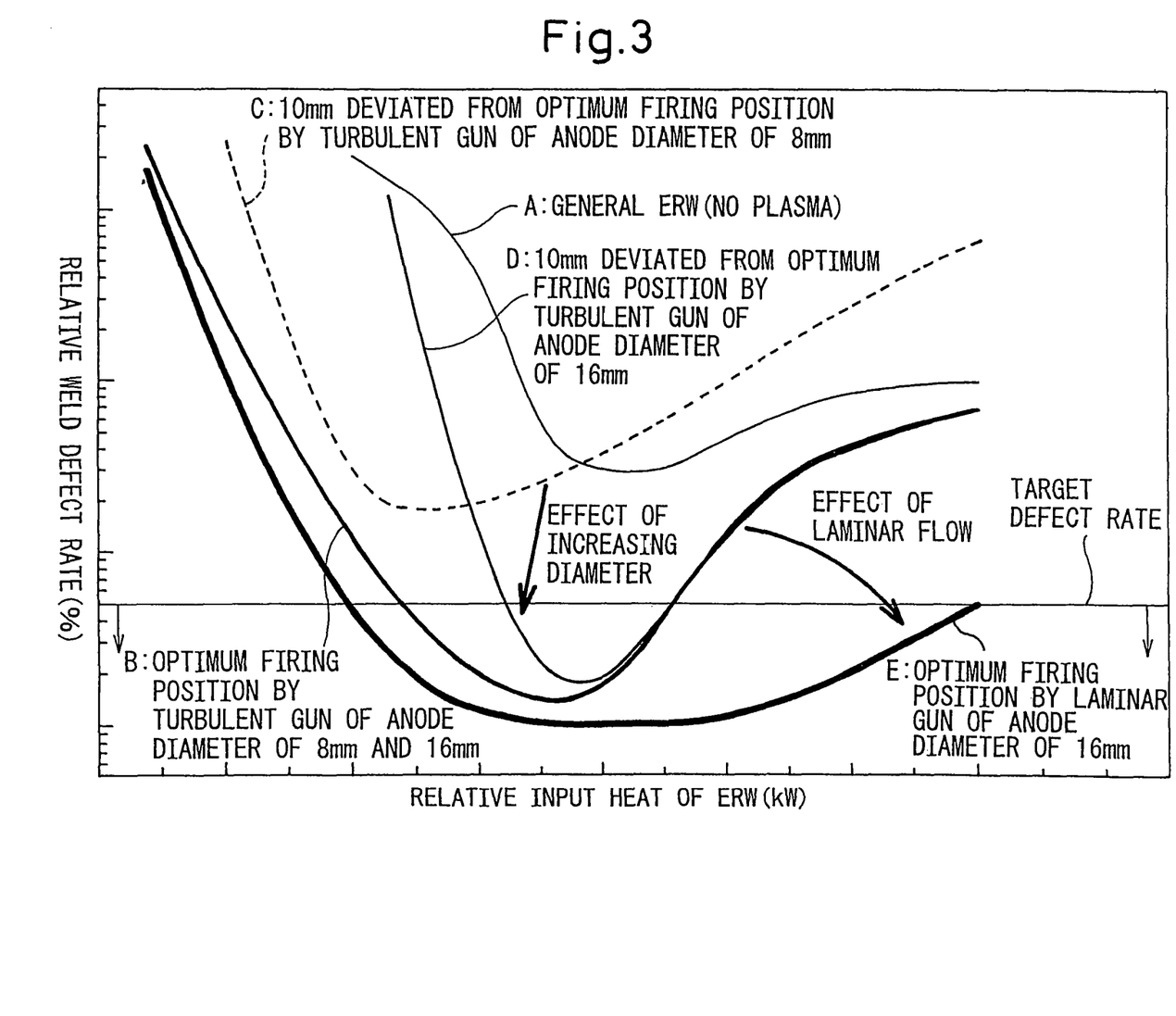
FIG. 3 is a view conceptually explaining the effect of increasing an anode inside diameter of a plasma gun employed by the present invention and the formation of plasma into a laminar flow.

Here, the effect of the increase of the anode inside diameter of the plasma gun 20 employed by the present invention and making the plasma (pseudo) laminar will be explained using FIG. 3.

With general welding of electric resistance welded steel pipe without firing plasma, if the input heat is lower than the optimum value, defects due to insufficient melting form, while if higher, oxides (penetrators) form. At this time, even with the optimum input heat, there is oxidation due to the cooling water or atmosphere around the welder, so when welding steel easily forming oxides, the defect rate cannot necessarily be said to be sufficiently low (in the figure, see curve A). As opposed to this, if firing reducing turbulent plasma, the water removal and reducing action or the melting of the surface oxides etc. by the plasma jet reduce the oxide defect rate (in the figure, see curve B). However, if the plasma diameter is small, the shield range 12 is narrow, so if the plasma firing position deviates by 10 mm, the effect of firing the plasma ends up disappearing (in the figure, see curve C). Here, if increasing the diameter of the plasma, the shield range 12 is enlarged, so even if the plasma firing position deviates by ±10 mm, the effect of the plasma in reducing defects is not impaired (in the figure, see curve D). Further, if making the plasma (pseudo) laminar, the reducing ability of the plasma is high and the shielding is possible due to the high temperature flame of the plasma (the plasma jet becomes longer by making the plasma laminar), so not only is the defect rate reduced under the conditions of the optimum value of the input heat of the electric resistance welding, but also even if the input heat deviates somewhat from the optimum range, the shield effect and auxiliary heat source effect combine and a high quality weld zone is stably obtained (in the figure, see curve E).

Note that at this time, if the input heat of the electric resistance welding greatly deviates from the optimum value, the length of the slit near the weld point (slit-shaped gap of molten state formed downstream of the weld point 9) becomes longer and melted part becomes outside the plasma shield range, so defects start to form.

The plasma diameter (≈anode diameter) has to be at least the plate thickness when the plasma firing angle is the horizontal direction, but in practice the plasma is fired by 15° to 30° from the horizontal direction, so the plasma diameter must be at least 80% of the plate thickness. Furthermore, to secure the shield range 12, it is preferable to make the firing angle as shallow as possible, but in practice with a firing angle smaller than 15°, the steel pipe surface is contacted. At this time, to secure a shield range 12 of ⅓ or more the power feed distance, it is more preferable to make the plasma diameter 16 mm or more. Note that the firing angle of 15° is an angle where the plasma gun and the steel pipe physically collide with each other. This angle changes depending on the configuration around the welder for the electric resistance welding. If the firing angle becomes 30° or more, the shield range 12 is insufficient, so this is not preferable.

Due to these, it is possible to enlarge the plasma firing range and prevent accidental contact between the relief shapes of the coil joint and the plasma gun.

Next, in the method of production of electric resistance welded steel pipe of the present invention described in (4), it is preferable to provide a front or a front outer circumference of the anode of said plasma gun with ejection ports at positions of distances from a center axis of 1.5 to 3.5 times the inside radius of said anode and with orientations facing axially symmetric directions in a range of 10 to 30° from the plasma center axial direction to the outside and eject from the ejection ports a side shield gas 11 comprised of one or more inert gases selected from the group comprising Ar gas, $N_2$ gas, and He gas and unavoidable impurity gases by a gas flow rate of 1 to 3 times the gas flow rate of said plasma toward the region 6 where the heating temperature of the steel plate 1 becomes 650° C. or more. By ejecting inert gas to the outer circumference of the plasma jet in this way, it is possible to suppress entrainment of the atmosphere into the plasma, lower the oxygen concentration in the plasma, and raise the hydrogen partial pressure/water partial pressure. Note that the hydrogen partial pressure/water partial pressure in the plasma can be calculated for example by finding the hydrogen concentration and water concentration from the temperature of the hydrogen molecules and water molecules found by the laser absorption method and laser induced fluorescence method etc. and the gas pressure assuming thermal equilibrium and atmospheric pressure and using the ratio of these values. Ejecting the side shield gas 11 is particularly effective when the power feed distance is long.

At this time, when the ejection position of the side shield gas 11 is less than 1.5 times the anode inside diameter of the plasma gun, cold gas enters the plasma upstream and the plasma temperature falls. On the other hand, if the ejection position of the side shield gas 11 is over 35 times the anode inside diameter of the plasma gun, the effect of the inert gas blocking the atmosphere can no longer be obtained. Further, if the flow rate of the side shield gas 11 is less than 1 time the flow rate of the plasma gas, the effect of blocking the atmosphere can no longer be obtained. On the other hand, if the flow rate of the side shield gas 11 is over three times the flow rate of the plasma gas, the plasma temperature greatly falls.

Note that the directions of ejection of the side shield gas 11 are preferably made axially symmetric directions of a range of 10 to 30° from the center axial direction of the plasma to the outside. If over 30°, the effect of the side shield is small and diffusion of the atmospheric oxygen to the plasma cannot be suppressed. On the other hand, if less than 10°, the cold side shield gas 11 ends up rapidly cooling the plasma.

Next, in the method of production of electric resistance welded steel pipe of the present invention described in (5), part or all of the $H_2$ gas forming said plasma working gas can be replaced by one or two of $H_2$ gas, $CH_4$ gas, and $C_2H_2$ gas. That is, as the plasma working gas, it is possible to use a mixed gas containing one or more gases of a $H_2$ gas, $CH_4$ gas, and $C_2H_2$ gas and Ar gas and having an Ar content of over 50 vol %. If using such a mixed gas, it is possible to increase the reducing ability at the abutting end faces 4a by the $H_2$ gas, $CH_4$ gas, and $C_2H_2$ gas, so in addition to the action and effect of making the above-mentioned anode point move to the plasma downstream side at the inner wall of the anode and facilitating the formation of a laminar plasma jet, the effect is obtained of suppressing the formation of oxides. Further, when nitrogen or carbon have been removed from the weld metal part, it is possible to add these elements by the plasma working gas. However, if excessive hydrogen is absorbed, hydrogen embrittlement cracking sometimes occurs, so to suppress this, seam normalization is preferably performed after welding.

Next, in the method of production of electric resistance welded steel pipe of the present invention described in (6), to form a high reducing ability laminar plasma, a fine powder of the higher reducing ability boride with an average particle size of 1 μm to 10 μm is fed to said reducing high temperature laminar plasma or reducing high temperature quasi-laminar plasma 5. The fine powder of the boride is preferably fed using Ar gas or nitrogen gas as the powder feed gas. When using Ar gas containing fine powder of boride as the powder feed gas, for example, a powder feeder is used to eject fine powder of boride with an average particle size of 1 μm to 10 μm from a feed position of the powder feed gas toward the plasma 5 using Ar gas as a carrier gas. Note that when the average particle size of the fine powder of boride is less than 1 μm, powder cannot be stably fed due to aggregation, while if over 10 μm, the boride will not be able to be completely melted or decomposed and may result in weld defects, so the average particle size of the fine powder of boride is preferably made 1 μm to 10 μm.

Next, in the method of production of electric resistance welded steel pipe of the present invention described in (7), when using high frequency starting without using a metal touch device or pilot plasma, preferably the cathode front end is made semispherical in shape and the radius of curvature of the cathode front end 21a is made ½ or less of the anode inside diameter. The smaller the radius of curvature of the cathode front end 21a, the greater the electromagnetic field strength at the cathode front end 21a and the easier the ignition of the plasma, but if the radius of curvature of the cathode front end 21a exceeds ½ of the anode inside diameter, the electromagnetic field at the space of the cathode front end becomes weaker and high frequency starting becomes difficult. However, when using an ignition system other than high frequency starting such as a metal touch device or pilot plasma, the electromagnetic field strength of the space at the cathode front end becomes irrelevant to the ignition, so the invention is not limited to this.

Next, in the method of production of electric resistance welded steel pipe of the present invention described in (8), an impeder is used in said method of production of electric resistance welded steel pipe and a ceramic having an electrical resistance at 300° C. based on JIS C2141 of $10^{11}$ to $10^{13}$ Ωcm and a thermal shock characteristic found by a water quenching method of 500° C. or more is used as for the material of an impeder case used for this impeder. In the method of production of electric resistance welded steel pipe, the current flows concentrating at the weld abutting faces due to the outer skin effect and the proximity effect, but to efficiently concentrate this current, an impeder is often placed near the weld point. To suppress heating due to the eddy current flowing to this impeder at the time of welding, the impeder is covered by an impeder case (in the past, made of an epoxy resin) and the impeder placed in the case is water cooled in some cases. When electric resistance welding while firing plasma, this epoxy resin (heat resistance temperature of 200° C. or less) impeder case is directly struck with a high temperature (1500° C. or more) plasma jet, so the epoxy resin material ends up being damaged by melting and cannot be used for the impeder case. As a material which can be used here, to avoid melt damage, the melting point has to be 1500° C. or more. Further, if the electrical resistance at 300° C. based on JIS C2141 is not $10^{11}$ to $10^{13}$ Ωcm, eddy current flows to the impeder case to heat and damage it. Further, if the thermal shock characteristic found by the water quenching method is not 500° C. or more, the material cannot withstand the thermal shock caused by the plasma heating from the outer surface and the water cooling from the inner surface etc. For example, $Si_3N_4$ and BN are ceramics satisfying this condition.

Next, in the method of production of electric resistance welded steel pipe of the present invention described in (9), to prevent accidental contact between the relief shapes at the coil joint and the plasma gun, the gun may be retracted when the joint passes near where the plasma gun is set. However, to avoid the reduction in yield of steel pipe by the retraction, the distance between the plasma gun front end and the steel pipe surface is preferably made 150 mm or more. Further, if making this distance over 300 mm, the shield effect falls, so the distance must be made within 300 mm.

Next, the electric resistance welded steel pipe of the present invention described in (10) is produced by a method of production described in any one of (1) to (9) using Si containing steel plate containing, by mass %, Si: 0.5 to 2.0% or Cr containing steel plate containing Cr: 0.5 to 26% as a steel pipe material. With the method of production of electric resistance welded steel pipe as described in any one of (1) to (9), firing the plasma has the effect of improvement of the defect rate of the electric resistance weld zone.

If the amount of Si of the steel pipe matrix (steel plate) is less than 0.5%, the defect rate is 0.01% or less even without firing plasma, so the present method of production, which leads to an increase in production costs, is not necessary. On the other hand, if the amount of Si of the steel pipe matrix (steel plate) exceeds 2.0%, the defect rate cannot be made 0.01% or less by just the effect of firing the plasma.

Further, regarding the amount of Cr of the steel pipe matrix (steel plate), if the amount of Cr is less than 0.5%, the defect rate is 0.01% or less even without firing plasma, so the present method of production, which leads to an increase in production costs, is not necessary. On the other hand, if the amount of Cr of the steel pipe matrix (steel plate) exceeds 26%, the defect rate cannot be made 0.01% or less by just the effect of firing the plasma. Therefore, to reduce the production costs and reduce the defect rate to 0.01% or less, the ingredients of the steel pipe matrix (steel plate) are preferably made, by mass %, Si: 0.5 to 2.0% or Cr: 2 to 26%.

Note that in the present invention, the other ingredients of the steel pipe matrix (steel plate) are not particularly limited. As other ingredients contributing to the formation of penetrators, there are Mn, Al, Ti, etc. Among these ingredients, Mn is preferably made a Mn/Si ratio of 7 to 9, but even outside this range, is 2% or less. Further, there is no particular problem if Al is made 0.05% or less and Ti is made 0.03% or less.

As explained above, in the method of production of electric resistance welded steel pipe of the present embodiment, steel plate 1 is shaped into a tube and the abutting parts are electric resistance welding during which the configuration of the plasma gun 20 and conditions for formation of the plasma 5 are optimized and the plasma jet is made laminar or quasi-laminar, so it is possible to stably reduce the weld defects due to oxides. Further, by blowing reducing high temperature plasma 5, it is also possible to expel or melt the spatter, scale, dust, and other weld defect factors, entering the weld zone due to spattering etc. at the time of welding, in a high temperature melted state by the shear force of the high temperature plasma fluid or the plasma heating. Furthermore, by blowing this reducing high temperature plasma 5, it is possible to melt the burrs at the abutting end faces 4 to a certain extent as well. There is also an effect of reduction of the defects occurring at the time of such nonsteady welding.

Further, in the method of production of electric resistance welded steel pipe of the present embodiment, the plasma jet is made laminar or quasi-laminar, so it is possible to also reduce the plasma jet noise occurring at the time of welding.

Note that in the present embodiment, the explanation was given with reference to the case of using a high frequency coil 2 to induction heat the steel plate 1 as an example, but the present invention is not limited to this. A contact tip may also be used for direct conduction heating.

Example 1

Below, examples of the present invention and comparative examples outside the range of the present invention will be given to specifically explain the effects of the present invention. In the present example, steel plate having the steel ingredients of Table 1 and a plate thickness of 5.3 mm, 11 mm, or 19 mm was used and a reducing plasma working gas of a mixed gas of $H_2$ gas, Ar gas, and nitrogen gas was used to produce electric resistance welded steel pipe by the method shown in the above-mentioned FIG. 1 and investigate the rate of occurrence of weld defects in the weld zone and the magnitude of the plasma jet noise at the time of welding.

The electric resistance welding conditions at that time, at the time of a plate thickness of 5.3 mm, were made a weld rate of 33 m/min, a weld input of 570 kW, a power feed distance (distance from high frequency coil 2 to weld point 9) of 160 mm, an upset amount of 3 mm, and an average apex angle (notation 13 in FIG. 1(b)) of 4°. Further, at the time of a plate thickness of 11 mm, the weld rate was made 18 m/min, the weld input 900 kW, the power feed distance 200 mm, the upset amount 6 mm, and the average apex angle 6°. Further, at the time of a plate thickness of 19 mm, the weld rate was made 18 m/min, the weld input 1200 kW, the power feed distance 200 mm, the upset amount 10 mm, and the average apex angle 7°. Further, the plate thickness, anode inside diameter, Ar gas and $H_2$ gas flow rates, value of $\{4\times(\Sigma G_i M_i)\}/\{\pi\times D\times \mu_{ave,T=7000}\}$, current, and voltage are shown in Table 2 and Table 3. Note that in this example, the gas flow rate is the flow rate in any standard state. Below, the same is true in Examples 2 and 3 as well. Further, the underlines in Table 2 and Table 3 show outside the range of the present invention or outside the preferable range of the present invention.

Further, for the weld defects, a Charpy impact test piece was cut out from the weld zone of electric resistance welded steel pipe after welding, a notch with a front end diameter of 0.25 mm and a depth of 0.5 mm was formed at the weld abutting parts, a Charpy impact test was conducted, then the fractured face of the ductile breakage part was observed and the area rate of the penetrators (weld defects due to oxides) to the weld area was measured. That value was evaluated as the weld defect rate. Further, a weld defect rate of 0.01% or less was judged as good and one over 0.01% was judged as poor.

The flow of the plasma jet was measured by the laser Doppler method. Further, the magnitude of the plasma jet noise at the time of welding was measured by a digital noise meter and 85 dB or less was judged as passing. The above results are shown as an overall evaluation in Table 2 and Table 3. Note that passing was indicated by "○", while failing was indicated by "χ".

TABLE 1

| Steel No. | C | Si | Mn | P | S | Al | Cr | Ni | Mo | Ti | Nb | Cu | Remarks |
|---|---|---|---|---|---|---|---|---|---|---|---|---|---|
| A | 0.10 | 1.40 | 1.58 | 0.015 | 0.010 | 0.011 | — | — | — | — | — | — | TRIP steel |
| B | 0.08 | 0.28 | 1.91 | 0.014 | 0.003 | 0.008 | — | — | — | 0.010 | 0.027 | — | Low alloy steel |
| C | 0.05 | 0.25 | 1.72 | 0.018 | 0.004 | 0.007 | 0.80 | 1.20 | 0.50 | 0.015 | 0.030 | 0.80 | Low alloy steel |
| D | 0.01 | 0.05 | 0.49 | 0.014 | 0.005 | 0.021 | 9.00 | 2.50 | 1.00 | — | — | — | 9% Cr steel |
| E | 0.20 | 0.45 | 0.40 | 0.025 | 0.006 | 0.010 | 12.80 | 0.36 | — | — | — | — | 13% Cr steel |

TABLE 2

| No. | Steel No. | Plate thickness mm | Anode inside diameter D (mm) | Cathode front end radius of curvature (mm) | Plasma working gas Ar (l/min) | Plasma working gas $H_2$ (l/min) | Plasma working gas $N_2$ (l/min) | $\mu_{aveT7000}$* kg/m/sec |
|---|---|---|---|---|---|---|---|---|
| Comp. Ex. 1 | E | 5.3 | <u>9</u> | 4 | 40 | 10 | 0 | 2.1E−04 |
| Comp. Ex. 2 | D | 5.3 | <u>9</u> | 4 | 20 | 10 | 0 | 2.1E−04 |
| Comp. Ex. 3 | C | 5.3 | <u>9</u> | 4 | 15 | 10 | 0 | 2.1E−04 |
| Comp. Ex. 4 | C | 5.3 | <u>9</u> | 4 | 15 | 10 | 0 | 2.1E−04 |
| Comp. Ex. 5 | C | 11 | <u>9</u> | 4 | 15 | 10 | 0 | 2.1E−04 |
| Comp. Ex. 6 | E | 11 | 16 | 8 | 30 | 5 | 0 | 2.2E−04 |
| Comp. Ex. 7 | E | 11 | 16 | 8 | 30 | 5 | 0 | 2.2E−04 |
| Comp. Ex. 8 | E | 11 | 16 | 8 | 20 | 10 | 0 | 2.1E−04 |
| Comp. Ex. 9 | E | 11 | 16 | 8 | 20 | 10 | 0 | 2.1E−04 |
| Comp. Ex. 10 | B | 11 | 16 | 8 | 10 | 7 | 0 | 2.1E−04 |
| Comp. Ex. 11 | B | 11 | 16 | 8 | 10 | 7 | 0 | 2.1E−04 |
| Comp. Ex. 12 | E | 11 | 16 | <u>10</u> | 20 | 10 | 0 | 2.1E−04 |
| Comp. Ex. 13 | E | 11 | 16 | 8 | 20 | <u>0</u> | 0 | 2.2E−04 |
| Comp. Ex. 14 | A | 11 | 16 | 8 | <u>15</u> | <u>20</u> | 0 | 1.9E−04 |
| Comp. Ex. 15 | A | 11 | 16 | 8 | 20 | 10 | 20 | 1.8E−04 |
| Inv. Ex. 1 | C | 5.3 | <u>9</u> | 4 | 15 | 10 | 0 | 2.1E−04 |
| Inv. Ex. 2 | B | 11 | 16 | 8 | 20 | 10 | 0 | 2.1E−04 |
| Inv. Ex. 3 | D | 11 | 16 | 8 | 15 | 10 | 0 | 2.1E−04 |
| Inv. Ex. 4 | D | 11 | 16 | 8 | 10 | 6.7 | 0 | 2.1E−04 |
| Inv. Ex. 5 | E | 11 | 16 | 8 | 30 | 5 | 0 | 2.2E−04 |
| Inv. Ex. 6 | E | 11 | 16 | 8 | 10 | 7 | 0 | 2.1E−04 |
| Inv. Ex. 7 | E | 11 | 16 | 8 | 10 | 5 | 10 | 1.8E−04 |
| Inv. Ex. 8 | A | 11 | 16 | 8 | 20 | 10 | 0 | 2.1E−04 |
| Inv. Ex. 9 | E | 19 | 25 | 8 | 30 | 15 | 0 | 2.1E−04 |
| Inv. Ex. 10 | C | 5.3 | <u>9</u> | 4 | 15 | 10 | 0 | 2.1E−04 |
| Inv. Ex. 11 | C | 5.3 | <u>9</u> | 4 | 15 | 10 | 0 | 2.1E−04 |

| No. | $\dfrac{4(\Sigma G_i M_i)}{\pi D \mu_{ave7000}}$ | Firing angle (°) | Side position diameter (mm) | Side position diameter/anode inside diameter | Side shield gas Ar (l/min) | Side shield gas $N_2$ (l/min) | Flow rate ratio (side/plasma) |
|---|---|---|---|---|---|---|---|
| Comp. Ex. 1 | 794 | 20 | 21 | 2.3 | 80 | 0 | 1.6 |
| Comp. Ex. 2 | 411 | 20 | 21 | 2.3 | 60 | 0 | 2.0 |
| Comp. Ex. 3 | 316 | 20 | 21 | 2.3 | 45 | 0 | 1.8 |
| Comp. Ex. 4 | 316 | 20 | 21 | 2.3 | 60 | 0 | 2.4 |
| Comp. Ex. 5 | 316 | 20 | 21 | 2.3 | 45 | 0 | 1.8 |
| Comp. Ex. 6 | 333 | 15 | 21 | <u>1.3</u> | 80 | 0 | 2.3 |
| Comp. Ex. 7 | 333 | 15 | 65 | <u>4.1</u> | 80 | 0 | 2.3 |
| Comp. Ex. 8 | 231 | <u>40</u> | 45 | 2.8 | 40 | 40 | 2.7 |
| Comp. Ex. 9 | 231 | <u>−20</u> | 45 | 2.8 | 40 | 40 | 2.7 |
| Comp. Ex. 10 | 119 | 20 | 45 | 2.8 | <u>10</u> | <u>0</u> | 0.6 |
| Comp. Ex. 11 | 119 | 20 | 45 | 2.8 | <u>60</u> | 0 | 3.5 |
| Comp. Ex. 12 | 231 | 20 | 45 | 2.8 | 60 | 0 | 2.0 |
| Comp. Ex. 13 | 220 | 20 | 45 | 2.8 | 60 | 0 | 3.0 |
| Comp. Ex. 14 | 199 | 20 | 45 | 2.8 | 60 | 0 | 1.7 |
| Comp. Ex. 15 | 464 | 25 | 45 | 2.8 | 40 | 40 | 2.7 |
| Inv. Ex. 1 | 316 | 20 | 21 | 2.3 | 45 | 0 | 1.8 |
| Inv. Ex. 2 | 231 | 15 | 45 | 2.8 | 60 | 0 | 2.0 |
| Inv. Ex. 3 | 178 | 25 | 45 | 2.8 | 45 | 0 | 1.8 |

TABLE 2-continued

| | | | | | | | |
|---|---|---|---|---|---|---|---|
| Inv. Ex. 4 | 118 | 25 | 45 | 2.8 | 45 | 0 | 2.7 |
| Inv. Ex. 5 | 333 | 20 | 45 | 2.8 | 80 | 0 | 2.3 |
| Inv. Ex. 6 | 119 | 20 | 45 | 2.8 | 80 | 0 | 4.7 |
| Inv. Ex. 7 | 232 | 20 | 45 | 2.8 | 80 | 0 | 5.3 |
| Inv. Ex. 8 | 231 | 20 | 45 | 2.8 | 60 | 0 | 2.0 |
| Inv. Ex. 9 | 222 | 15 | 45 | 1.8 | 90 | 0 | 2.0 |
| Inv. Ex. 10 | 316 | 20 | 21 | 2.3 | 30 | 30 | 2.4 |
| Inv. Ex. 11 | 316 | 20 | 21 | 2.3 | 0 | 60 | 2.4 |

Underlines: Condition over (preferable) range of present invention
*Values drawn from or referring to Themal Plasmaz, M. Boulos et al, Plenum Press, Appendix data. When including nitrogen, average value from same data used.
**By feeding Ar gas including average particle size 3 μm boride $B_2O_3$ as powder feeding gas by feed rate of 15 l/min, boride $B_2O_3$ fed by feed rate of 10 g/min.

TABLE 3

| | Cathode-anode | | High freq. start | Current (A) | Voltage (V) | Borides** | Flow of jet | Results of evaluation | | | |
|---|---|---|---|---|---|---|---|---|---|---|---|
| No. | L (mm) | L/D | | | | | | Plasma stability | Noise at welding (dB) | Weld defect rate (%) | Overall evaluation |
| Comp. Ex. 1 | 8 | 0.89 | Good | 400 | 69 | None | Turbulent | | 110 | 0.06 | X (noise, quality) |
| Comp. Ex. 2 | 8 | 0.89 | Good | 350 | 65 | None | Turbulent | | 100 | 0.07 | X (noise, quality) |
| Comp. Ex. 3 | 6 | 0.67 | Good | 350 | 110 | None | Turbulent | | 115 | 0.2 | X (noise, quality) |
| Comp. Ex. 4 | 100 | 11.11 | Poor | 450 | 400 | None | Turbulent | Unstable | 85 | 0.01 | X (instability) |
| Comp. Ex. 5 | 22 | 2.44 | Good | 350 | 255 | None | Quasi-laminar | | 80 | 0.3 | X (quality) |
| Comp. Ex. 6 | 30 | 1.88 | Good | 300 | 180 | None | Laminar | | 83 | 0.3 | X (quality) |
| Comp. Ex. 7 | 30 | 1.88 | Good | 300 | 180 | None | Laminar | | 83 | 0.3 | X (quality) |
| Comp. Ex. 8 | 26 | 1.63 | Good | 350 | 220 | None | Quasi-laminar | | 80 | 0.18 | X (quality) |
| Comp. Ex. 9 | 26 | 1.63 | Good | 350 | 220 | None | Quasi-laminar | | 80 | 0.30 | X (quality) |
| Comp. Ex. 10 | 26 | 1.63 | Good | 200 | 140 | None | Quasi-laminar | | 80 | 0.09 | X (quality) |
| Comp. Ex. 11 | 26 | 1.63 | Good | 200 | 140 | None | Quasi-laminar | | 80 | 0.10 | X (quality) |
| Comp. Ex. 12 | 26 | 1.63 | Good | 350 | 240 | None | Turbulent | Unstable | 80 | 0.11 | X (quality, instability) |
| Comp. Ex. 13 | 8 | 0.50 | Good | 300 | 120 | None | Laminar (no reducing power) | | 70 | 0.27 | X (quality) |
| Comp. Ex. 14 | 8 | 0.50 | Good | 350 | 330 | None | Turbulent | Unstable | 95 | 0.33 | X (noise, quality, instability) |
| Comp. Ex. 15 | 26 | 1.63 | Good | 350 | 90 | None | Turbulent | | 90 | 0.18 | X (noise, quality) |
| Inv. Ex. 1 | 22 | 2.44 | Good | 350 | 255 | None | Quasi-laminar | | 80 | 0.01 | ○ |
| Inv. Ex. 2 | 26 | 1.63 | Good | 450 | 280 | None | Quasi-laminar | | 80 | 0.01 | ○ |
| Inv. Ex. 3 | 22 | 1.38 | Good | 350 | 255 | None | Quasi-laminar | | 70 | 0.01 | ○ |
| Inv. Ex. 4 | 22 | 1.38 | Good | 350 | 200 | None | Quasi-laminar | | 70 | 0.01 | ○ |
| Inv. Ex. 5 | 30 | 1.88 | Good | 300 | 160 | None | Laminar | | 83 | 0.01 | ○ |
| Inv. Ex. 6 | 30 | 1.88 | Good | 200 | 140 | None | Quasi-laminar | | 75 | 0.01 | ○ |
| Inv. Ex. 7 | 30 | 1.88 | Good | 300 | 220 | None | Quasi-laminar | | 80 | 0.01 | ○ |
| Inv. Ex. 8 | 26 | 1.63 | Good | 350 | 220 | Yes | Quasi-laminar | | 80 | 0.003 | ○ |
| Inv. Ex. 9 | 70 | 2.80 | Good | 550 | 350 | None | Quasi-laminar | | 80 | 0.003 | ○ |
| Inv. Ex. 10 | 70 | 7.78 | Good | 450 | 300 | None | Quasi-laminar | | 80 | 0.01 | ○ |
| Inv. Ex. 11 | 70 | 7.78 | Good | 450 | 300 | None | Quasi-laminar | | 80 | 0.01 | ○ |

Underlines: Condition exceeding (preferable) range of present invention
*Values drawn from or referring to Themal Plasmaz, M. Boulos et al, Plenum Press, Appendix data. When including nitrogen, average value from same data used.
**By feeding Ar gas including average particle size 3 μm boride $B_2O_3$ as powder feeding gas by feed rate of 15 l/min, boride $B_2O_3$, fed by feed rate of 10 g/min As shown in Table 2 and Table 3, Comparative Example 1 and Comparative Example 2 not satisfying the condition of the above formula <1> and further having an applied voltage of 120V or less had turbulent flows of plasma jet, weld defect rates of over 0.01%, and plasma jet noise at the time of welding of over 100 dB or higher than the standard 85 dB.

Comparative Example 3 had a distance from the front end of the cathode of the plasma gun to the anode formable position of 6 mm, while Comparative Example 4 had a same distance of 11 times the anode inside diameter D, both outside the range of a distance L from the front end of the cathode of the plasma gun to the anode formable position of 8 mm or more and not more than 10 times the anode inside diameter D, so noise and instability of the plasma occurred.

Comparative Example 5 satisfies the conditions of the above formula <1>, but had an applied voltage of 120V or less, so the flow of the plasma jet was quasi-laminar and the noise was also low, but the anode inside diameter was smaller than the plate thickness and the shield was insufficient, so the weld defect rate exceeded 0.01%.

Comparative Example 6 had the outer circumference of the front of the anode of the plasma gun provided with slits for ejection of side shield gas at positions of a distance from the center axis of 1.3 times the inside radius of said anode, while Comparative Example 7 had this provided with slits at positions of 4.1 times the same, both outside the above range of 1.5 to 3.5 times, so the effect of the side shield gas 11 was not obtained and the defect rate exceeded 0.01%.

In Comparative Example 8, the directions of ejection of the side shield gas 11 were 40° to the outside from the center axis of the plasma, while in Comparative Example 9, a mixed gas of Ar gas and $N_2$ gas was fed to −20° (20° to the inside), both outside the range of the present invention of the range of 10 to 30°, so the effect of the side shield gas 11 was not obtained and the defect rate exceeded 0.01%.

Comparative Example 10 had a side shield gas flow rate/plasma working gas flow rate of 0.6, while Comparative Example 11 had the same of 3.5, both outside the range of the present invention of a flow rate ratio of 1 to 3, so the effect of the side shield gas 11 was not obtained and the defect rate exceeded 0.01%.

Comparative Example 12 had a radius of curvature of the spherical front end of the cathode of 10 mm or more than ½ of the anode inside diameter and outside the range of the present invention, so the plasma was unstable.

Comparative Example 13 had a plasma working gas not containing hydrogen or outside the range of the present invention, so had no reducing power and had a weld defect rate over 0.01%. Further, Comparative Example 14 had a plasma working gas containing hydrogen in a volume percentage of 57% or outside the range of the present invention of less than 50 vol % of $H_2$ gas, so the plasma was unstable.

Comparative Example 15 is the case of using a plasma working gas of an argon-hydrogen-nitrogen mixed gas, but did not satisfy the conditions of the above formula <1>, had a turbulent flow of plasma jet. It had a weld defect rate of 0.01%, but the plasma jet noise at the time of welding was a large 90 dB.

On the other hand, examples of the present invention are shown in Invention Example 1 to Invention Example 11. All satisfy the above formula <1>. In Invention Example 1, the anode diameter is 9 mm, but the plate thickness is smaller than the anode diameter, so this falls in the range of the present invention. Invention Examples 2 to 6 are examples of cases of using an argon-hydrogen mixed gas for the plasma working gas. The gas flow rates and currents and voltages were optimized. Further, Invention Example 7 is an example of using an argon-hydrogen-nitrogen mixed gas for the plasma working gas. Further, in Invention Example 8, boride (average particle size 3 μm $B_2O_3$) is fed to the plasma jet by powder feeding argon gas (flow rate 10 l/min) to further raise the reducing power. Invention Example 9 is an example of production of line pipe use steel pipe with a plate thickness of 19 mm and uses an anode with an anode diameter of 25 mm or larger than the other invention examples. Invention Examples 10 and 11 are examples of using an argon-nitrogen mixed gas or nitrogen gas for the side shield gas 11.

Example 2

Next, examples of electric resistance welded steel pipe according to the resent invention and comparative examples outside the range of the present invention will be given to specifically explain the effects of the present invention. In the present example, a hoop material having the steel ingredients shown in Table 4, a plate thickness of 6.0 mm, and a width of 32 mm obtained by laboratory melting and laboratory rolling was used and a mixed gas of $H_2$ gas and Ar gas was used as a reducing plasma working gas to prepare a electric resistance welding test piece by a laboratory welder and investigate the rate of occurrence of weld defects of that weld zone (water spraying rate of 1 l/min).

The electric resistance welding conditions at that time were made a welding rate of 33 m/min, a weld input of 320 kW, a power feed distance of 150 mm, an upset amount of 6 mm, and an average apex angle of 4°. For the anode inside diameter, Ar gas and $H_2$ gas flow rates, value of $\{4\times(\Sigma G_i M_i)\}/\{\pi\times D\times\mu_{ave,T=7000}\}$, current, and voltage, the conditions of Invention Example 1 in Table 2 and Table 3 were used. The results are shown in Table 4.

TABLE 4

| No. | Steel No. | Chemical ingredients (mass %) | | | | | | Weld defect rate (%) | |
|---|---|---|---|---|---|---|---|---|---|
| | | C | Si | Mn | P | S | Cr | No plasma | Plasma |
| Comp. Ex. 21 | F | 0.10 | 0.15 | 1.50 | 0.015 | 0.010 | — | 0.005 | 0.003 |
| Comp. Ex. 22 | G | 0.11 | 2.90 | 1.50 | 0.014 | 0.009 | — | 5.0 | 0.030 |
| Comp. Ex. 23 | H | 0.20 | 0.15 | 1.50 | 0.015 | 0.009 | 30 | 4.0 | 0.020 |
| Inv. Ex. 21 | I | 0.10 | 0.60 | 1.50 | 0.015 | 0.010 | — | 0.2 | 0.005 |
| Inv. Ex. 22 | J | 0.11 | 1.80 | 1.50 | 0.014 | 0.010 | — | 2.0 | 0.010 |
| Inv. Ex. 23 | K | 0.10 | 0.15 | 1.50 | 0.014 | 0.010 | 0.5 | 0.1 | 0.005 |
| Inv. Ex. 24 | L | 0.11 | 0.15 | 1.50 | 0.014 | 0.009 | 2.25 | 0.2 | 0.005 |
| Inv. Ex. 25 | M | 0.10 | 0.15 | 1.50 | 0.015 | 0.009 | 9 | 0.3 | 0.005 |
| Inv. Ex. 26 | N | 0.10 | 0.15 | 1.50 | 0.015 | 0.009 | 13 | 0.5 | 0.010 |
| Inv. Ex. 27 | O | 0.10 | 0.15 | 1.50 | 0.015 | 0.010 | 22 | 1.0 | 0.010 |

The steel plate of Comparative Example 21 contains 0.15% of Si and 0% of Cr. Firing of plasma improved the defect rate, but even with normal welding (without firing of plasma), the weld defect rate was 0.01% or less. However, the incidental scale formed when surface scale bites into the weld zone was not included in the weld defects here, but when there was surface scale, the effect of firing plasma was observed.

The steel material of Comparative Example 22 contained 2.9% of Si which is outside the suitable range of the present invention of Si: 0.5 to 2.0%, so the effect of plasma irradiation was insufficient and the weld defect rate exceeded 0.01%.

The steel material of Comparative Example 23 contained 30% of Cr which is outside the suitable range of the present invention of Cr: 0.5 to 26, so the effect of plasma irradiation was insufficient and the weld defect rate exceeded 0.01%.

On the other hand, Invention Examples 21 and 22 are the cases of steel materials with high amounts of Si, while Invention Examples 23 to 27 are cases of steel materials with high amounts of Cr. In all cases, the ingredients are in the range of the present invention, so the firing of plasma reduced the weld defect rates. The defect rates were 0.01 or less.

Example 3

Next, examples in the case of changing the impede case material when producing steel pipe by the present invention and comparative examples outside the range of the present invention will be given to specifically explain the effects of the present invention. In the present example, damage to the impeder case when producing electric resistance welded steel pipe using steel plate with a plate thickness of 5.3 mm and a width of 273 mm (D of Table 1) and using as the reducing plasma working gas, a mixed gas of $H_2$ gas and Ar gas was investigated. For the anode inside diameter, Ar gas and $H_2$ gas flow rates, the value of $\{4\times(\Sigma G_i M_i)\}/\{\pi\times D\times\mu_{ave,T=7000}\}$, current, and voltage, the conditions of Invention Example 1 in Table 2 and Table 3 were used. The results are shown in Table 5. Note that as an overall evaluation, passing was indicated as "◯" while failing was indicated as "χ".

TABLE 5

|  | Material | Melt damage | Cracking due to thermal shock | Electrical resistance (Ω cm) | Damage due to eddy current | Overall |
|---|---|---|---|---|---|---|
| Comp. Ex. | Epoxy resin | Yes | Burnout, so cannot be evaluated |  | No | X |
|  | SiC | No | No cracking | $10^4$ | Yes | X |
|  | AlN | No | Cracking | $10^{11}$ to $10^{13}$ | No | X |
|  | $Al_2O_3$ | No | Cracking | $10^{14}$ | No | X |
|  | $ZrO_2$ | No | Cracking | $10^{16}$ | No | X |
| Inv. Ex. | $Si_3N_4$ | No | No cracking | $10^{11}$ to $10^{13}$ | No | ○ |
|  | BN | No | No cracking | $10^{11}$ to $10^{13}$ | No | ○ |

If using an epoxy resin for the impeder case, since it would be exposed to a plasma jet of over 2000K, the epoxy resin would be damaged by melting even with water cooling. Further, if using SiC, since SiC has an electrical resistance of $10^4$ Ωcm or outside the range of the present invention and an eddy current would flow to the impeder case, the Joule heat would cause the SiC to rise in temperature. Further if using AlN, $Al_2O_3$, $ZrO_2$, etc. for the impeder case, even if the electrical resistance were in the range of the present invention, the materials all have thermal shock resistances of less than 500° C., so the impeder case would break.

On the other hand, in the case of BN or $Si_3N_4$, the electrical resistance and thermal shock characteristics are in the range of the present invention, so the impeder case does not break.

INDUSTRIAL APPLICABILITY

According to the present invention, the plasma blowing conditions when shaping steel plate into a tube and electric resistance welding the abutting parts are made suitable and the plasma jet is made laminar or quasi-laminar (plasma core is laminar while several mm at outside of plasma is turbulent), so it is possible to stably reduce weld defects due to oxides and possible to reduce plasma jet noise occurring at the time of welding, therefore the effect in industry is incalculable.

The invention claimed is:

1. A method of production of electric resistance welded steel pipe, comprising:
   shaping steel plate into a tube;
   electric resistance welding abutting end faces of the tube, forming a weld seam in the tube;
   applying a voltage in a cathode gas between a cathode and an anode in a cascade type plasma gun, generating a plasma;
   introducing an anode gas inside the anode to eject the plasma as a reducing plasma working gas from the cascade type plasma gun, the reducing plasma working gas comprising from 2 volume percent to less than 50 volume percent of $H_2$ gas and a balance of one of: Ar gas and unavoidable impurity gases; or a mixture of Ar gas and one or both of $N_2$ gas, He gas, and unavoidable impurities,
   the reducing plasma working gas comprising the plasma, the cathode gas, and the anode gas, wherein the anode gas is ejected toward plasma at the plasma downstream side from a front end of the cathode so as to form laminar plasma or pseudo-laminar plasma, and wherein
   the reducing plasma working gas is in the form of a reducing high temperature laminar plasma or a reducing high temperature quasi-laminar plasma; and
   blowing the reducing plasma working gas onto the abutting end faces in a region of the tube at a point prior to a weld point of said electric resistance welding where the weld seam is formed, and where the temperature is at least 650° C., and
   wherein the anode has an inside diameter D;
   a distance L from the front end of the cathode of said cascade type plasma gun to an anode formable position is at least 8 mm and not more than 10 times the anode inside diameter D;
   the voltage applied between the cathode and anode of the cascade type plasma gun is greater than 120V, and
   the plasma blowing conditions satisfy the following formula <1>

$$150 < \frac{4 \times \left(\sum G_i M_i\right)}{\pi \times D \times \mu_{ave,T=7000}} < 400 \qquad <1>$$

where $G_i$ is the flow rate in the standard state of said plasma working gas in liters per minute, $M_i$ is the relative molecular weight of said plasma working gas, D is the anode inside diameter in meters, and $\mu_{ave,T=7000}$ is the viscosity coefficient at 7000K is, thereby providing a laminar or quasi-laminar reducing plasma working gas.

2. The method of production of electric resistance welded steel pipe of claim 1, wherein said plasma gun has an anode inside diameter D of 16 mm to 30 mm.

3. The method of production of electric resistance welded steel pipe of claim 1, wherein
   the anode of the cascade type plasma gun has a center axis, an inside radius, and a front or a front outer circumference, the front or the front outer circumference comprising ejection ports positioned at a distance from the center axis of the anode of 1.5 to 3.5 times the inside radius of said anode, the ejection ports having orientations facing axially symmetric directions in a range of 10° to 30° from the plasma center axial direction to the outside; and
   ejecting a side shield gas comprising one or more inert gases from the ejection ports, the side shield gas comprising one or more inert gases selected from the group consisting of Ar gas and unavoidable impurity gases, $N_2$ gas and unavoidable impurity gases, and He gas and unavoidable impurity gases at a gas flow rate of 1 to 3 times the reducing plasma working gas flow rate.

4. The method of production of electric resistance welded steel pipe of claim 1, wherein part or all of the $H_2$ gas forming said plasma working gas is replaced by at least one of $CH_4$ gas and $C_2H_2$ gas.

5. The method of production of electric resistance welded steel pipe of claim 1, further comprising feeding boride powder having an average particle size of 1 μm to 10 μm into said reducing high temperature laminar plasma or reducing high temperature quasi-laminar plasma.

6. The method of production of electric resistance welded steel pipe of claim 1, wherein the anode has an inside diameter, and the cathode comprises a front end having a semispherical shape, the semispherical shape of the cathode front end having a radius of curvature of no more than ½ of the anode inside diameter.

7. The method of production of electric resistance welded steel pipe of claim 1, further comprising:
    using an impeder having an impeder case of a ceramic having an electrical resistance at 300° C. based on JIS C2141 of $10^{11}$ to $10^{13}$ Ωcm, the ceramic resistant to thermal shock from water quenching at a temperature of at least 500° C.

8. The method of production of electric resistance welded steel pipe of claim 1, wherein a distance between a front end of said plasma gun and the steel pipe surface is 150 mm to 300 mm.

* * * * *